United States Patent
Sandtner (10) Patent No.: US 9,589,168 B2
(45) Date of Patent: Mar. 7, 2017

(54) AUTOMATIC STORAGE SCHEME BY SIMULTANEOUS ID RECOGNITION

(71) Applicant: Infineon Technologies AG, Neubiberg (DE)

(72) Inventor: Klaus Sandtner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/669,904

(22) Filed: Mar. 26, 2015

(65) Prior Publication Data

US 2016/0283765 A1    Sep. 29, 2016

(51) Int. Cl.
*G06Q 30/00*    (2012.01)
*G06K 7/14*    (2006.01)
*G06K 7/10*    (2006.01)

(52) U.S. Cl.
CPC ....... *G06K 7/1439* (2013.01); *G06K 7/10009* (2013.01)

(58) Field of Classification Search
CPC ............. G06K 7/1439; G06K 7/10009; G06K 7/1443; G06K 7/1447
USPC ......... 235/435, 385, 462.11, 462.08, 462.41, 235/462.44
See application file for complete search history.

(56) References Cited

U.S. PATENT DOCUMENTS

| | | | | |
|---|---|---|---|---|
| 5,493,107 A * | 2/1996 | Gupta | ...................... | G06K 1/121 235/375 |
| 6,598,025 B1 * | 7/2003 | Hamilton | ............. | G06Q 10/087 235/385 |
| 7,146,243 B2 * | 12/2006 | Glynn | ..................... | G06Q 30/06 235/385 |
| 7,358,857 B1 * | 4/2008 | White | ................... | G01S 5/0018 235/435 |
| 7,605,702 B2 * | 10/2009 | Uchimura | ................. | G01S 5/16 235/385 |
| 7,693,757 B2 * | 4/2010 | Zimmerman | .......... | G06Q 10/00 235/462.11 |
| 7,747,342 B2 * | 6/2010 | Glynn | ..................... | G06Q 30/06 235/385 |
| 8,079,765 B1 | 12/2011 | Bledsoe et al. | | |
| 8,210,430 B1 | 7/2012 | Grant et al. | | |
| 8,261,973 B2 | 9/2012 | Grant et al. | | |
| 8,444,049 B2 | 5/2013 | Wang | | |
| 8,474,714 B1 | 7/2013 | Grant et al. | | |
| 8,851,375 B2 * | 10/2014 | Allard | ..................... | G06Q 30/06 235/383 |
| 2003/0102373 A1 * | 6/2003 | Swartz | ................... | G06Q 30/06 235/383 |
| 2005/0035694 A1 * | 2/2005 | Stevens | ................... | A47B 53/00 312/201 |
| 2005/0090931 A1 * | 4/2005 | Glynn | ..................... | G06Q 30/06 700/215 |
| 2005/0139679 A1 * | 6/2005 | Salvato | ................. | G06F 1/1622 235/462.44 |

(Continued)

*Primary Examiner* — Paultep Savusdiphol
(74) *Attorney, Agent, or Firm* — Shumaker & Sieffert, P.A.

(57) ABSTRACT

A code input device is used to simultaneously read a first code and a second code. The code input device includes at least one of a camera or a field reader. A determination is then made as to whether the first code and the second code are in accordance with a set of rules. When the view of the first code and the second code are in accordance with the set of rules, an assignment function that is associated with at least the first code is performed.

20 Claims, 10 Drawing Sheets

(56) References Cited

U.S. PATENT DOCUMENTS

| | | | |
|---|---|---|---|
| 2007/0078558 A1* | 4/2007 | Glynn | G06Q 30/06 700/215 |
| 2007/0138290 A1* | 6/2007 | Salvato | G06F 1/1622 235/462.44 |
| 2008/0077511 A1* | 3/2008 | Zimmerman | G06Q 10/00 705/28 |
| 2008/0278324 A1* | 11/2008 | Uchimura | G01S 1/70 340/572.1 |
| 2009/0204512 A1* | 8/2009 | Connell, II | G06Q 10/087 705/28 |
| 2010/0138280 A1* | 6/2010 | Fowler | G06Q 10/087 705/28 |
| 2012/0019399 A1 | 1/2012 | Vargo et al. | |
| 2013/0015243 A1* | 1/2013 | Garber | D06F 73/02 235/385 |
| 2013/0048724 A1* | 2/2013 | Burnside | G06Q 10/087 235/385 |
| 2013/0153650 A1* | 6/2013 | Clayton | G06Q 10/06311 235/375 |
| 2014/0003727 A1* | 1/2014 | Lortz | G06Q 10/087 382/218 |
| 2014/0091142 A1* | 4/2014 | Pacque | G07F 17/12 235/380 |
| 2014/0304123 A1* | 10/2014 | Schwartz | G06Q 10/087 705/28 |
| 2015/0054620 A1* | 2/2015 | Graube | G06K 7/10009 340/10.1 |
| 2015/0363625 A1* | 12/2015 | Wu | G06K 7/146 382/203 |

\* cited by examiner

FIG. 10

AUTOMATIC STORAGE SCHEME BY SIMULTANEOUS ID RECOGNITION

TECHNICAL FIELD

This disclosure relates to electronic circuits, and more specifically, to identification (ID) code recognition schemes.

BACKGROUND

Storage and management of inventory is a critical function of many businesses, including the manufacturing, retail, and shipping industries. For efficiency purposes, it is desirable to communicate product information to a centralized inventory tracking system as the product is being removed or placed on shelves, rather than requiring a separate entry of product information at a central location after removal or placement of the product.

One conventional method for communicating product information to an inventory tracking system includes UPC bar codes that are placed on the products and portable bar code scanners that are carried by the workers manipulating the product. Portable bar code scanners are typically plugged in as an attachment to a portable electronic device such as a mobile computer device. The scanners are used to scan the codes of UPC labels or information on a variety of different items for the purpose of managing, storing, shipping, or otherwise handling such items. Such scanners use optical light signals that are passed over the UPC does to read the codes. Generally, the scanners are pointed at the UPC codes.

Other methods for communicating product information to an inventory tracking system may use radio frequency identification (RFID) tags. When used on products as an inventory label, RFID tags can communicate data to an RFID reader somewhat similar to a UPC code. An RFID tag includes a microchip with data, an antenna, and sometimes a power source such as a battery (e.g. active RFID tag). An RFID reader also has an antenna, and the RFID reader's antenna transmits electromagnetic energy in the form of an RF beam or radio waves to the vicinity of the RFID tags. Each RFID tag that is located within the range of the RFID reader then energizes and sends identification information back to the RFID reader via RF radio signals.

SUMMARY

In some examples, a code input device is used to simultaneously read a first code and a second code. The code input device includes at least one of a camera or a field reader. A determination is then made as to whether the first code and the second code are in accordance with a set of rules. When the view of the first code and the second code are in accordance with the set of rules, an assignment function that is associated with at least the first code is performed.

In some examples, a method for identification recognition comprises simultaneously reading, via a code input device, both a first code and a second code, wherein the code input device includes at least one of a camera or a field reader. The method may also include determining whether the first code and the second code are in accordance with a set of rules, and when the first code and the second code are in accordance with the set of rules, performing an assignment function that is associated with at least the first code.

In some examples, a device for identification recognition comprises at least code input device that is configured to simultaneously read both a first code and a second code, wherein the code input device includes at least one of a camera or a field reader. The device may also include a processor that is configured to: determine whether the first code and the second code are in accordance with a set of rules, and when the first code and the second code are in accordance with the set of rules, perform an assignment function that is associated with at least the first code.

In some examples, a tangible processor-readable storage medium stores processor-readable code for identification recognition which, when executed by one or more processors, causes the one or more processors to: based on input received from a code input device, simultaneously read both a first code and a second code, wherein the code input device includes at least one of a camera or a field reader; determine whether the first code and the second code are in accordance with a set of rules; and when the first code and the second code are in accordance with the set of rules, perform an assignment function that is associated with at least the first code.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may be the case. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal.

Figure 1:
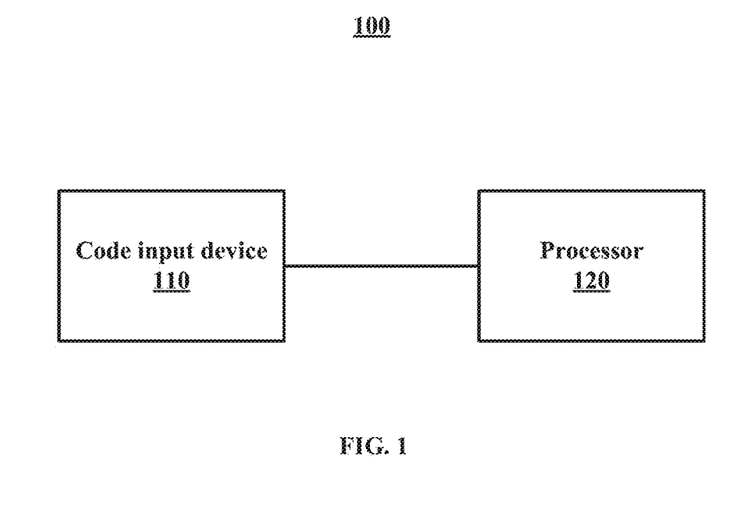
FIG. 1 is a block diagram illustrating an example of a device for identification recognition.

FIG. 1 is a block diagram illustrating an example of device 100 in accordance with aspects of the disclosure. Device 100 includes code input device 110 and processor 120, which may be configured to perform one or more techniques of this disclosure.

In particular, code input device 110 is configured to simultaneously read both a first code and a second code. Code input device 110 includes a camera and/or a field reader. Examples of a field reader include but are not limited to an RFID (radio frequency identification) reader.

Processor 120 is arranged to perform actions, including determining whether the first code and the second code are in accordance with a set of rules, and when the first code and the second code are in accordance with the set of rules, performing an assignment function that is associated with at least the first code.

Figure 2:
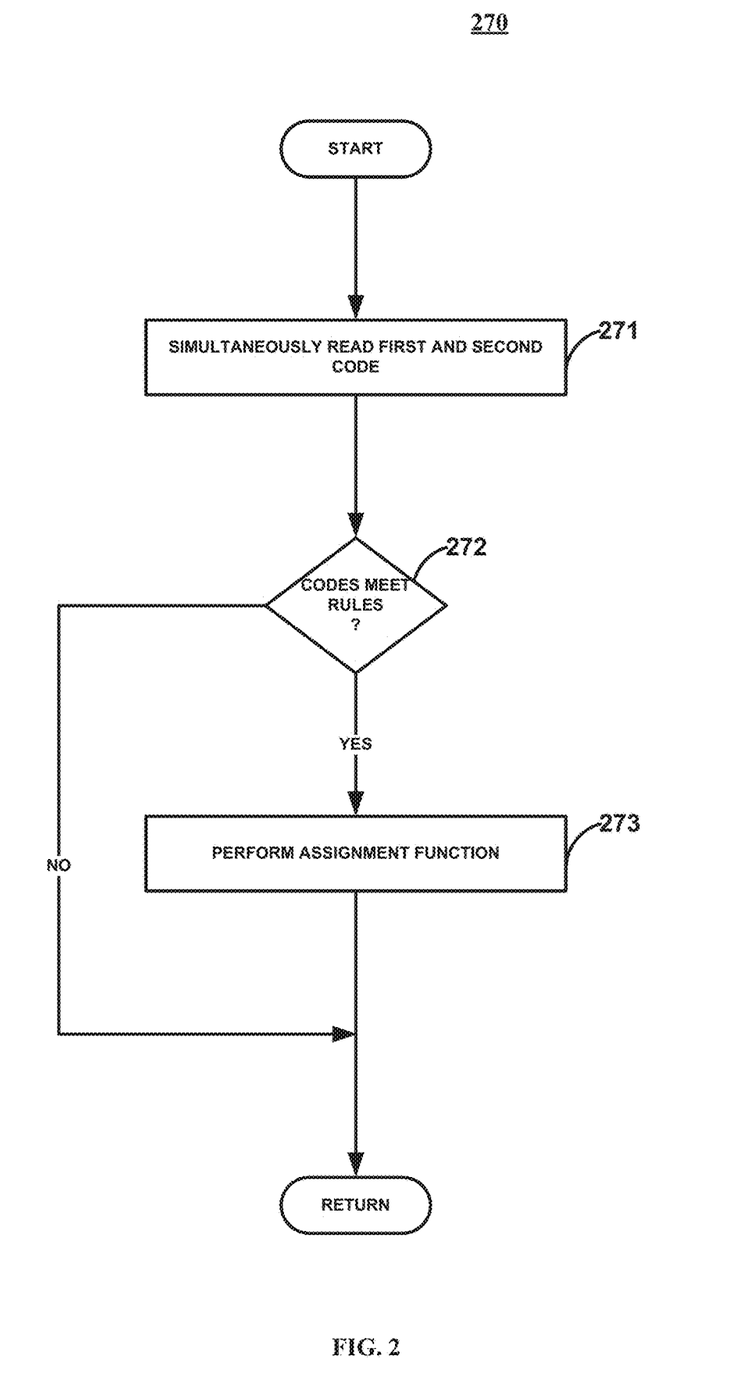
FIG. 2 is a flow diagram illustrating an example of a method for identification recognition.

FIG. 2 is a flow diagram illustrating an example of a method (270) for identification recognition. Method 270 may be performed, for instance, by an example of device 100 of FIG. 1.

After a start block, a code input device (e.g., 110 of FIG. 1) simultaneously reads both a first code and a second code (271). The code input device includes a camera and/or a field reader. Then, a component such as processor 120 of FIG. 1 determines whether the first code and the second code are in accordance with a set of rules (272). If, not, the process proceeds to a return block, where other process is resumed. However, when the first code and the second code are in accordance with the set of rules, a component such as processor 120 of FIG. 1 performs an assignment function that is associated with at least the first code. The processing then proceeds to a return block, where other processing is resumed.

Figure 3:
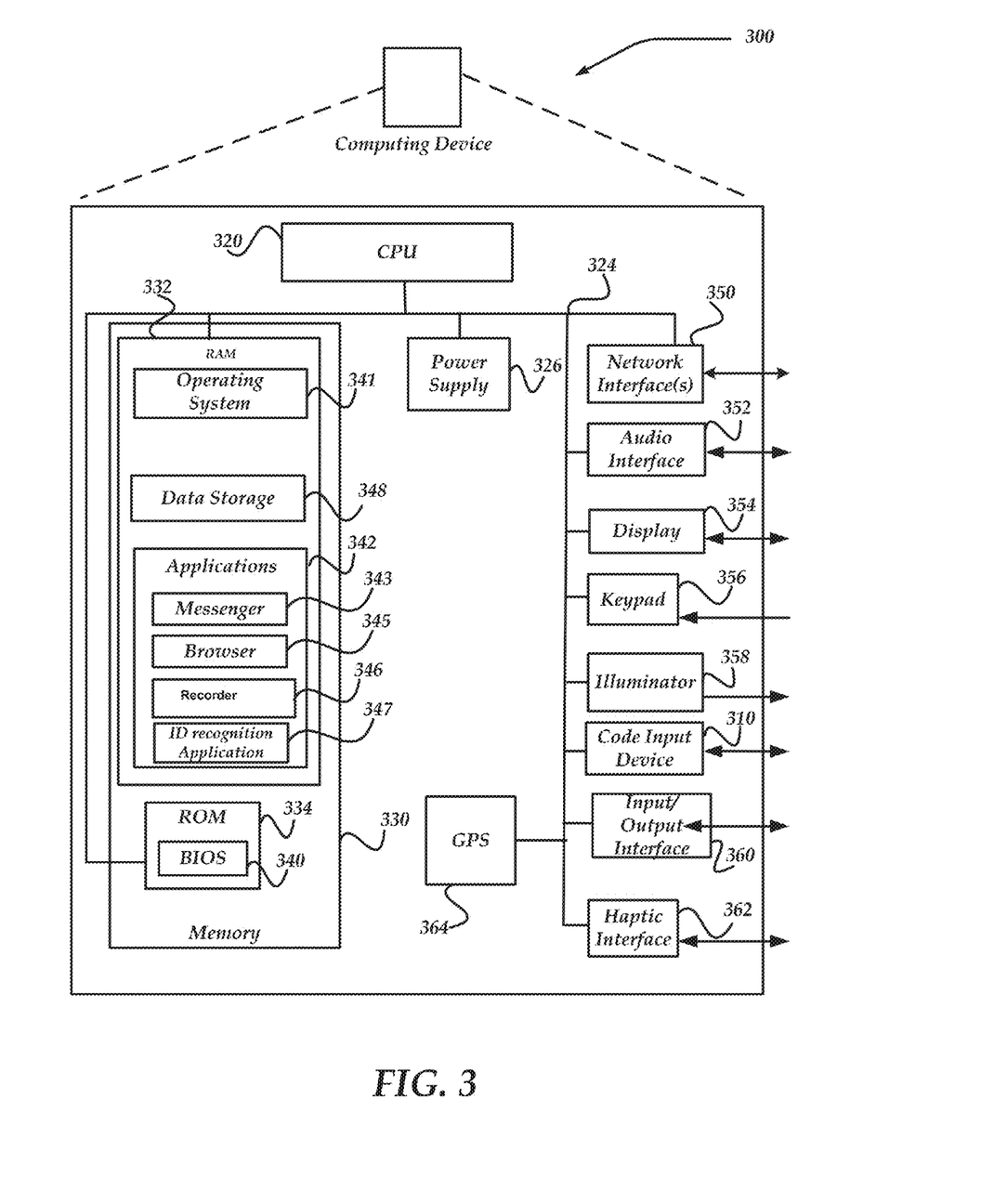
FIG. 3 is a block diagram illustrating an example of the device of FIG. 1.

FIG. 3 is a block diagram illustrating an example of computing device 300, which may be employed as an example of device 100 of FIG. 1. Computing device 300 may include many more or less components than those shown in FIG. 3. However, the components shown are sufficient to disclose an illustrative example in accordance with the disclosure.

As shown in FIG. 3, computing device 300 includes a processing unit (CPU) 320 in communication with a mass memory 330 via a bus 324. Computing device 300 may also include a power supply 326, one or more network interfaces 350, an audio interface 352, code input device 310, a display 354, a keypad 356, an illuminator 358, an input/output interface 360, a haptic interface 362, and an optional global positioning systems (GPS) receiver 364. Power supply 326 provides power to computing device 300. A rechargeable or non-rechargeable battery may be used to provide power. The power may also be provided by an external power source, such as an AC adapter or a powered docking cradle that supplements and/or recharges a battery.

Computing device 300 may optionally communicate with a base station (not shown), or directly with another computing device. Network interface 350 includes circuitry for coupling computing device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 350 is sometimes known as a transceiver, transceiving device, or network interface card (NIC).

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Some examples of code input device 310 may include a video interface that is arranged to capture video images, such as a still photo, a video segment, an infrared video, or the like. For instance, examples of a video interface in code input device 310 may be coupled to a digital video camera, a web-camera, other type of camera, or the like. Examples of a video interface in code input device 310 may comprise a lens, an image sensor, and other electronics. Image sensors may include a complementary metal-oxide-semiconductor (CMOS) integrated circuit, charge-coupled device (CCD), or any other integrated circuit for sensing light. In one example, examples of a video interface in code input device 310 may interact with recorder 346 application to manage such actions.

Some examples of code input device 310 include an electromagnetic field reader. In some examples, the electromagnetic field reader may include an RFID reader, or the like. Some example of code input device 310 may include a video interface but no electromagnetic field reader, some examples of code input device 310 may include an electromagnetic field reader but no video interface, and some examples of code input device 310 may include a video interface and an electromagnetic field reader.

Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the computing device is powered. Also, illuminator 358 may backlight these buttons in various patterns when particular actions are performed, such as dialing another computing device. Illuminator 358 may also cause light sources positioned within a transparent or translucent case of the computing device to illuminate in response to actions.

Computing device 300 may also comprise input/output interface 360 for communicating with external devices, such as a headset, or other input or output devices not shown in FIG. 3. Input/output interface 360 can utilize one or more communication technologies, such as USB, infrared, Bluetooth™, Wi-Fi, Zigbee, or the like. Haptic interface 362 is arranged to provide tactile feedback to a user of the computing device. For example, the haptic interface may be employed to vibrate computing device 300 in a particular way when another user of a computing device is calling.

Optional GPS transceiver 364 can determine the physical coordinates of computing device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of computing device 300 on the surface of the Earth.

Mass memory 330 includes a RAM 332, a ROM 334, and other storage means. In some examples, RAM 332 and ROM 334 may be one device rather than two devices, or RAM 332 and ROM 334 may be two devices in which RAM 332 has some of the properties associated with a traditional ROM, and/or ROM 334 may have some of the properties associated with a traditional RAM. Mass memory 330 may include flash memory or other types of memory in some examples. Mass memory 330 illustrates another example of computer-readable storage media for storage of information such as computer-readable instructions, data structures, program modules, or other data. In some examples, mass memory 330 may include a tangible, processor-readable storage medium that is arranged to encode processor-readable code. Through the specification and the claims, the term "tangible processor-readable storage medium" is specifically defined herein to exclude propagating signals per se, but the scope of the term "tangible processor-readable storage medium" does include random access memory (RAM), register memory, processor cache, and the like. Mass memory 330 may store a basic input/output system ("BIOS") 340 for controlling low-level operation of computing device 300. The mass memory may also store an operating system 341 for controlling the operation of computing device 300. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 330 may further include one or more data storage 348, which can be utilized by computing device 300 to store, among other things, applications 342 and/or other data.

Applications 342 may include computer-executable instructions which, when executed by computing device 300, transmit, receive, and/or otherwise process messages (e.g., SMS, MMS, IM, email, and/or other messages), multimedia information, and enable telecommunication with another user of another computing device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 342 may include, for example, messenger 343, and browser 345. Some applications 342 may be embodied on a tangible, processor-readable storage medium that, when executed on a processor, is arranged to perform actions.

Browser 345 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 343 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 343 may be configured as an IM application, such as AOL Instant Messenger, Yahoo! Messenger, .NET Messenger Server, ICQ, or the like. In one embodiment messenger 343 may be configured to include a mail user agent (MUA) such as Elm, Pine, MH, Outlook, Eudora, Mac Mail, Mozilla Thunderbird, or the like. In another embodiment, messenger 343 may be a client application that is configured to integrate and employ a variety of messaging protocols.

Applications 342 may include ID recognition application 347. In some examples, ID recognition application 347 may control part or all of the process of FIG. 2.

Figure 4:
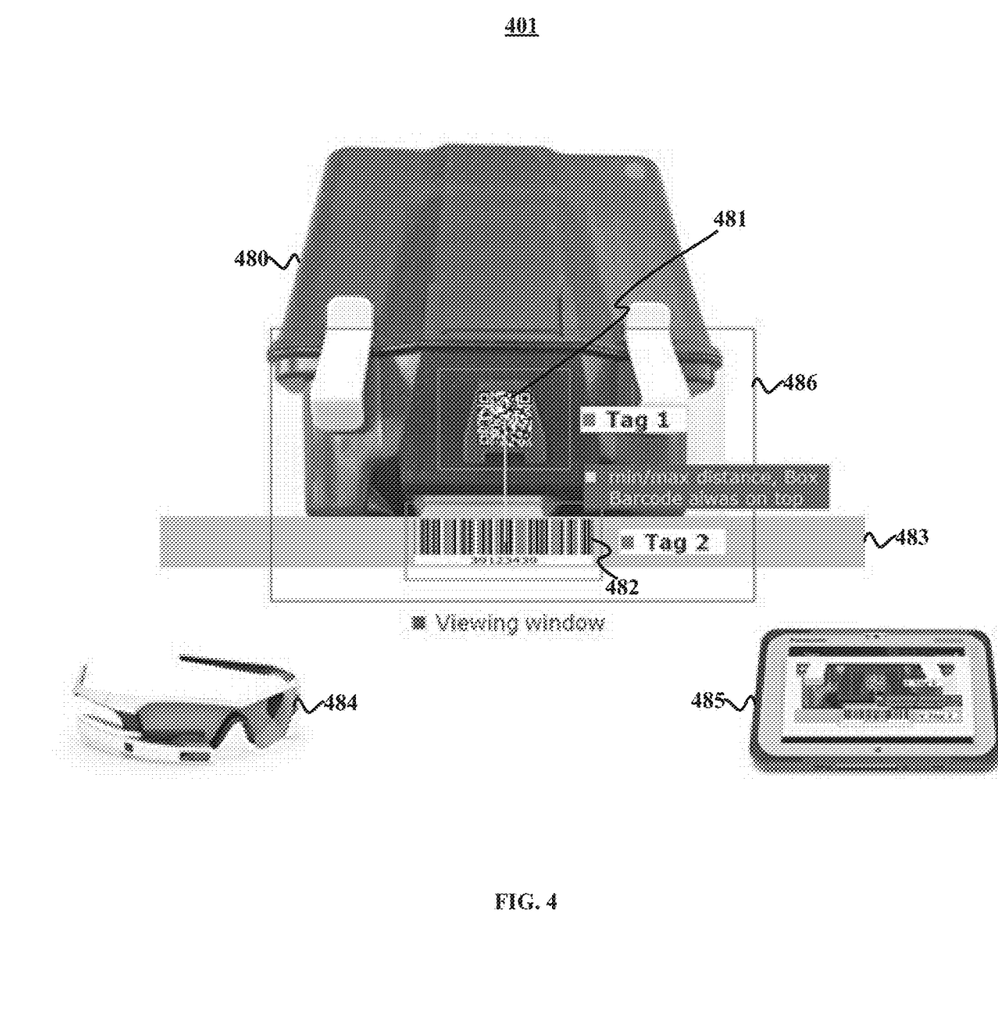
FIG. 4 is a block diagram illustrating an example environment including examples of two codes which may be read by a camera in an example of the device of FIG. 1.

FIG. 4 is a block diagram illustrating an example environment 401 including examples of two codes which may be read by device 100 of FIG. 1 and/or computing device 300 of FIG. 3. Environment 401 includes lot 480, code 481, code 482, shelf 483, wearable device 484, tablet device 485, and viewing window 486. Wearable device 484 is an example of a head-mounted display that may include an example of a code input device, but other types of wearable device 484 may also be employed in other examples within the scope and spirit of the disclosure.

In some example, lot 480 is on shelf 483, code 481 is affixed to lot 480, and code 482 is affixed to shelf 483.

Codes 481 and 482 may be viewed by a code input device, where the code input device may include, for example, a camera, a field reader, and/or the like. In some examples, the code input device is included on a mobile device, such as wearable device 484, tablet device 485, or the like. In some examples, the code input device includes a camera which employs a viewing window 486, representing the field of view of the camera at a particular point in time for use in reading the codes (e.g., 481 and 482) that are within the field of view.

In some examples, the code input device simultaneously reads code 481 and 482. In some examples, the device (e.g., 484 or 485) determines whether code 481 and 482 are in accordance with a set of rules. In some examples, the set of rules include a maximum distance between the two codes (e.g., a rule that the codes be no further than 3 cm from each other), a rule that there are exactly two codes in the viewing window including exactly one first code (e.g., lot code) and at least one second code (e.g., shelf location code), a rule that code 482 must be beneath code 481 (a rule that may be referred to as the tag order rule), and a rule that the two codes must be substantially aligned with each other. Example rules and rule violations for examples with a camera as the code input device are shown in further detail with regard to FIGS. 5A-6.

Figure 5A:
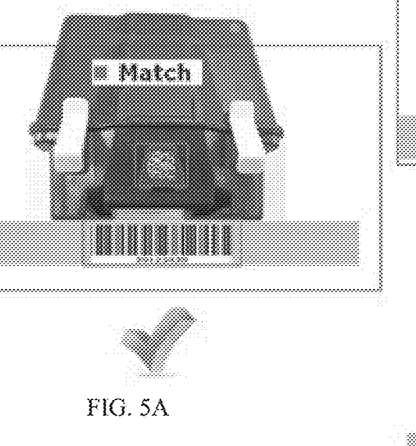
FIGS. 5A-5C are diagrams illustrating examples of matches in which the codes in the viewing window do or do not meet an example set of rules.

FIG. 5A is a diagram illustrating an example of a match in which the codes in the viewing window meet an example set of rules. The first code and the second code are within a minimum distance of each other, the second code is beneath the first code, and the two codes are substantially aligned with each other.

Figure 5B:
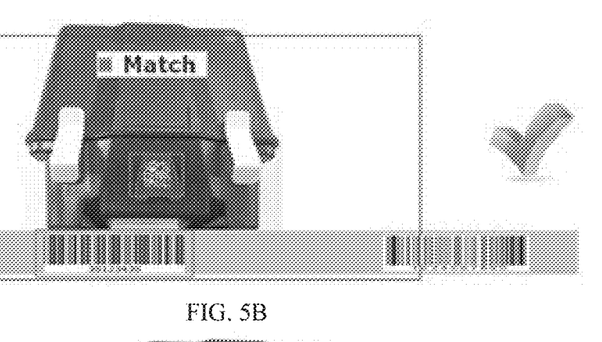

FIG. 5B is a diagram illustrating another example of a match in which the codes in the viewing window meet an example set of rules. The first code and the second code are within a minimum distance of each other, the second code is beneath the first code, and the two codes, while not precisely aligned as the example in FIG. 5A, are still sufficiently aligned to meet an example set of rules. The fact that a very small section of another code is within the viewing window does not create a rule violation in this example set of rules, because less than half of the other code is within the viewing window, and the other code is greater than the minimum distance, while the code matching codes are within the minimum distance.

Figure 5C:
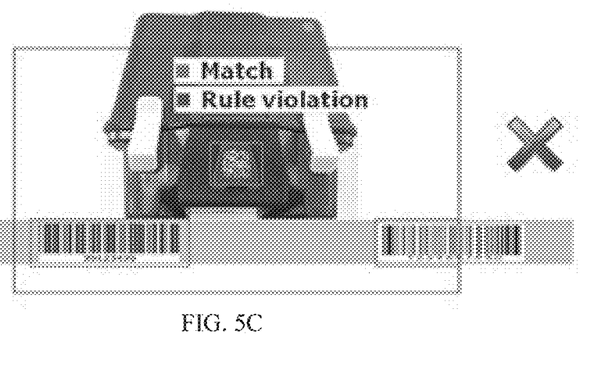

FIG. 5C is a diagram illustrating another example of a match in which the codes in the viewing window do meet an example set of rules. First, there are two second codes, one of which is entirely within the viewing window, and another of which about half of the code is within the viewing window. This is a rule violation. Second, although there is a match between the first code and the second code that is contained entirely within the viewing window, the second code is not substantially aligned with the first code.

Figure 6:
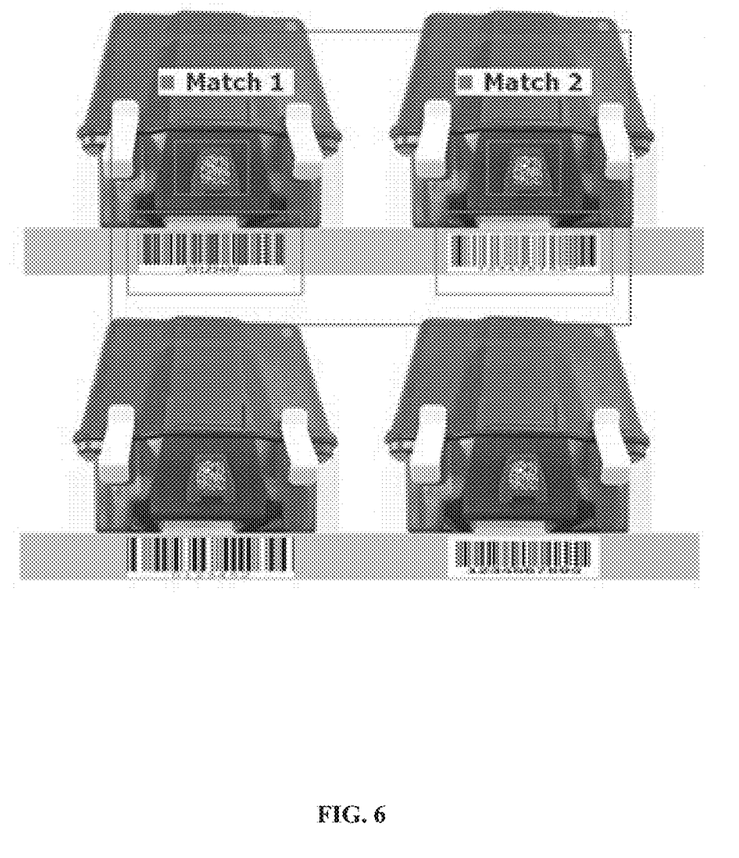
FIG. 6 is a diagram illustrating another example of two matches in which the codes in the viewing window do not meet an example set of rules.

FIG. 6 is a diagram illustrating another example of two matches in which the codes in the viewing window do not meet an example set of rules. As shown, there are two matches, and all rules are met except that there are too many codes in the viewing window, resulting in two matches, which is a rules violation. One example rule requires exactly two codes visible in the viewing window, and in the example of FIG. 6, four codes are visible.

In another example, there is no rule requiring exactly two codes visible in the viewing window, and with four codes visible in the viewing window, there can be two valid matches if each individual match meets all of the rules. In this example, the situation illustrated in FIG. 6 could result in two valid matches.

Rules violations that include a match may be dealt with in different ways in different examples. In some examples that include one match only, the two codes may be re-aligned. In other examples, the viewing window may be reduced so that there are exactly two codes in the viewing window. In other examples, one or two matches within the viewing window may be selected by the user via gestures, voice command, and/or interaction (touch) with the device. Some examples may have all of the options available for the user to select a match, and other examples may have only one of these options or two of these options available (e.g., some examples may only allow selection via voice command, some examples may only allow selection via touch interaction with the device, and some may allow both).

Figure 7:
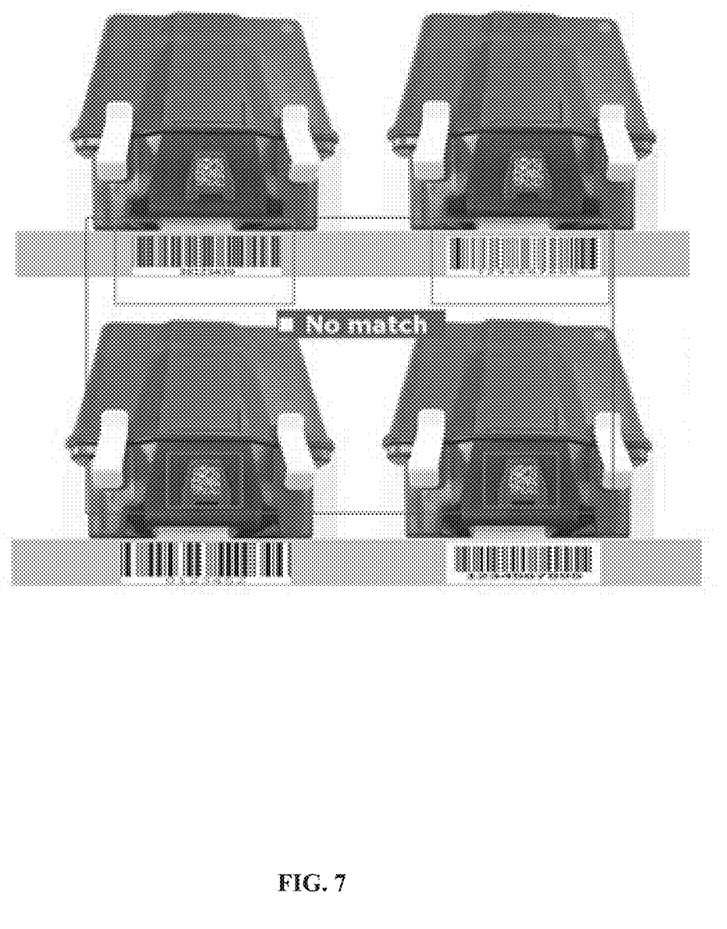
FIG. 7 is a diagram illustrating an example scenario with no valid matches and in which the codes in the viewing window do not meet an example set of rules.

FIG. 7 is a diagram illustrating an example scenario with no valid matches and in which the codes in the viewing window do not meet an example set of rules. As shown, there are four codes in the viewing windows, but the tag order rule is violated (the shelf codes are above the lot codes, whereas an example rule requires the shelf codes to be below the lot codes), and there is a distance violation (the distance between the codes exceeds a pre-determined distance).

Figure 8:
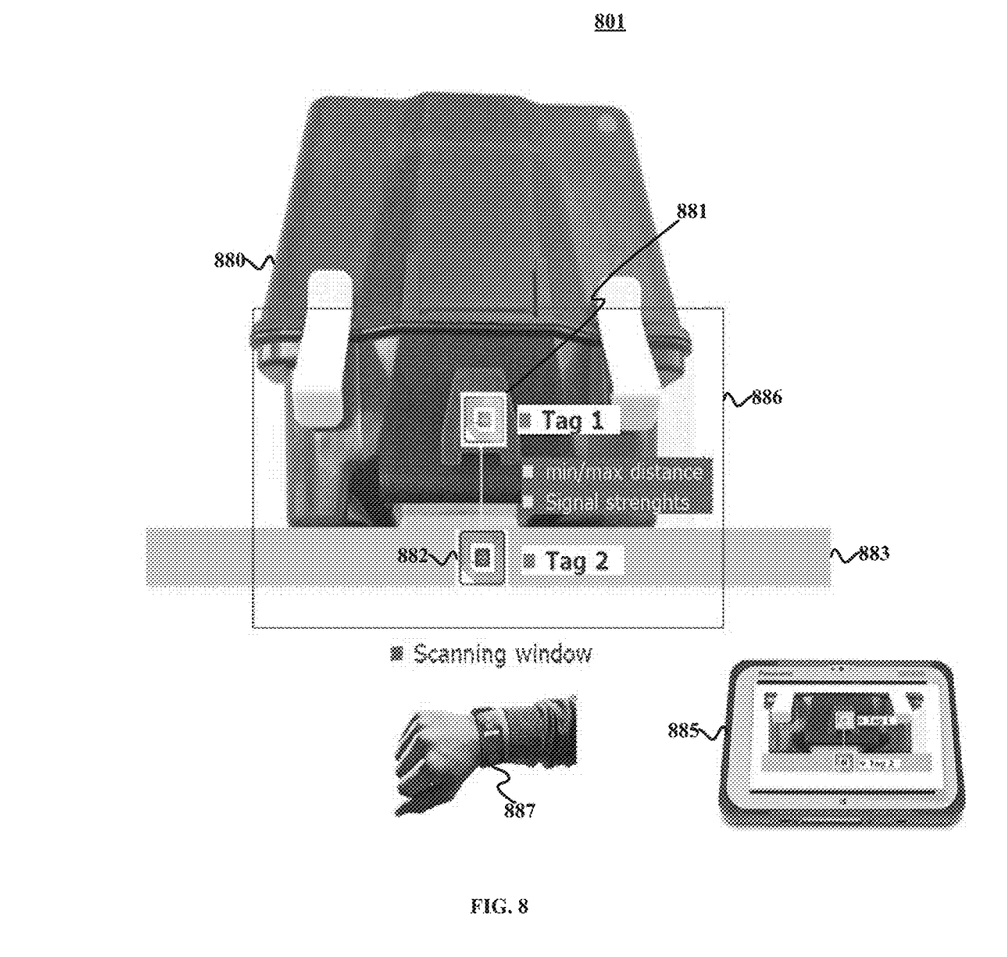
FIG. 8 is a block diagram illustrating an example environment including examples of two codes which may be read by a fielder reader in the device of FIG. 1.
Figure 9A:
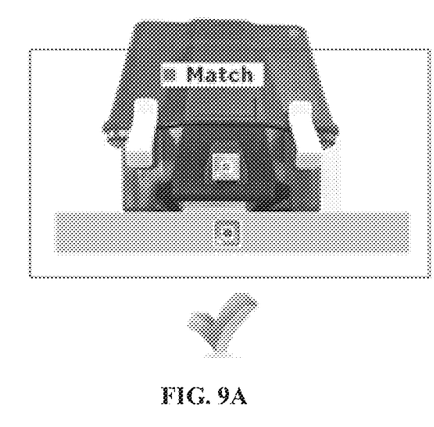
FIGS. 9A-9C are diagrams illustrating examples of matches in which the codes in the scanning window meet or do not meet an example set of rules.
Figure 9B:
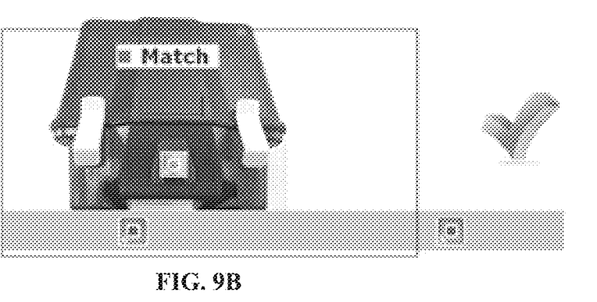
Figure 9C:
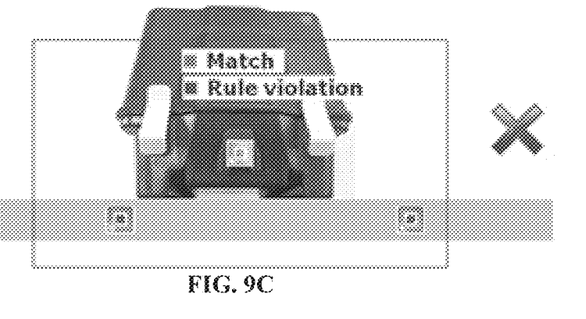
Figure 10:
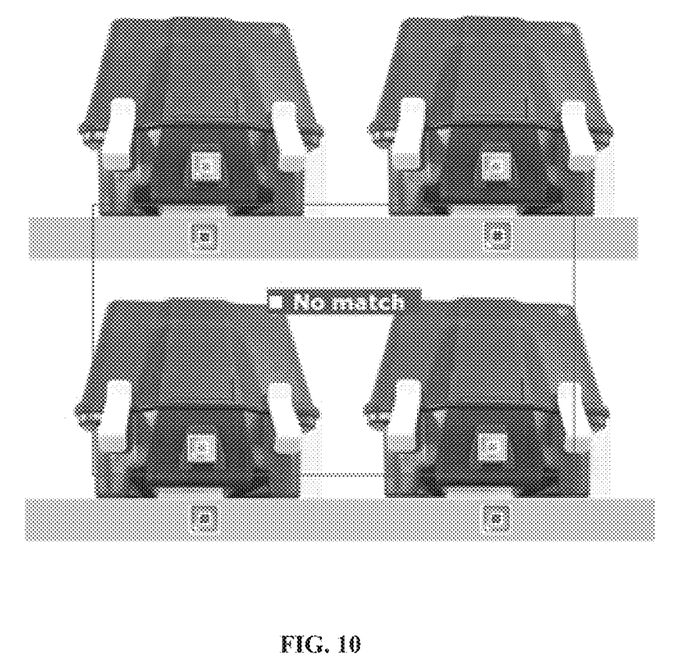
FIG. 10 is a diagram illustrating an example scenario with no valid matches and in which the codes in the viewing window do not meet an example set of rules, in accordance with aspects of the present disclosure.

Example rules and rule violations for examples with an RFID (radio-frequency identification) reader as the code input device are shown in further detail with regard to FIGS. 8-10.

FIG. 8 is a block diagram illustrating an example environment 801 including examples of two codes which may be read by device 100 of FIG. 1 and/or computing device 300 of FIG. 3. Environment 801 includes lot 880, code 881, code 882, shelf 883, wearable device 887, tablet device 885, and scanning window 886. Wearable device 887 is an example of a smart watch that includes an example of a code input device, but other types of wearable devices may also be employed in other examples within the scope and spirit of the disclosure.

In some examples, lot 880 is on shelf 883, code 881 is affixed to lot 880, and code 882 is affixed to shelf 883.

Codes 881 and 882 may be viewed by a code input device, such as an RFID reader, and/or the like. In some examples, the code input device is included on a mobile device, such as wearable device 887, tablet device 885, or the like. In some examples, the code input device includes an RFID reader which employs a scanning window 886.

In some example, the code input device simultaneously reads code 881 and 882. In some examples, the device (e.g., 885 or 887) determines whether code 881 and 882 are in accordance with a set of rules. In some examples, the set of rules include a maximum distance between the two codes, and a rule that exactly two codes are within the scanning window including exactly one first code (e.g., lot code) and exactly one second code (e.g., shelf location code). In some examples, maximum distance may be evaluated via signals strengths of the input signals from the codes. Example rules and rule violations for examples with an RFID reader as the code input device are shown in further detail with regard to FIGS. 9A-10.

FIG. 9A is a diagram illustrating an example of a match in which the codes in the scanning window meet an example set of rules. The first code and the second code are within a minimum distance of each other, and there exactly two codes in the scanning window, including one of the first type (e.g., the lot code) and one of the second type (the shelf location code).

FIG. 9B is a diagram illustrating another example of a match in which the codes in the scanning window meet an example set of rules. The first code and the second code are within a minimum distance of each other. There is a third code nearby, but it is not within the scanning window, and so the third code does not create a rule violation.

FIG. 9C is a diagram illustrating another example of a match in which the codes in the scanning window do meet an example set of rules. There are two second codes in the scanning window, which is a rule violation.

FIG. 10 is a diagram illustrating an example scenario with no valid matches and in which the codes in the viewing window do not meet an example set of rules. As shown, there are four codes in the scanning window, which violates a rule, and there is a distance violation (the distance between the codes exceeds a pre-determined distance).

Referring again to FIG. 3, some examples of computing device 300 may be arranged to simultaneously read two codes, such as, in some examples, a shelf location ID and an asset ID, that are simultaneously read by code input device 310 and a suitable application (e.g., 347) running in the background.

In some examples, code input device 310 simultaneously reads the two codes, if the two codes are currently unassigned, application 347 assigns the asset/lot code to the shelf code. In some example, if the two codes are already assigned, application 347 books out the asset/lot in response to reading the code. In some example, if either of the codes is already assigned but the first code is not assigned to the second code, application 347 may identify the assignment as a wrong assignment. In some examples, in the case of either a wrong assignment or a failure in the assignment process, computing device visualizes an alarm. Also, in some examples, after simultaneously reading the codes and performing other related actions discussed above, such as making an assignment, booking out an asset, or the like, computing device 300 may enable a speech or gesture interaction to be used execute or confirm the transaction.

Examples of computing device 300 may be used for simultaneous, dynamic "on-the-fly" assignment of storage location of assets. In some examples, computing device 300 may operate with multiple operating modes. For instance, in some examples, one operating mode may be for assignment, and another operating mode may be used for verification of previous assignments. In other examples, computing device 300 does not use multiple operating modes, and unassigned codes are assigned, while previously-assigned codes are verified.

For instance, in some examples, an assignment mode may be used for initial assignment. When computing device 300 simultaneously reads two codes and determines that there is a valid match and no rule violation, if both codes are unassigned, then computing device 300 assigns the first code to the second code. In some examples, before actually assigning the first code to the second code, computing device 300 may ask the user to confirm the assignment. In other examples, computing device 300 makes the assignment automatically without requiring confirmation. If either code is already assigned, then computing device 300 does not make an assignment. In various examples, computing device 300 does not make an assignment, no action may be taken, a determination made be made as to whether the first code is assigned to the second code, or various other actions may be made in various examples.

In some examples, computing device 300 uses a verification in which codes are not assigned, but computing device 300 simultaneously reads two codes and determines that there is a valid match and no rule violation, computing device 300 makes a determination is made as to whether either code is assigned. If both codes are assigned, computing device 300 makes a determination as to whether the first code is assigned to the second code. If not, computing device 300 indicates an error or an alarm. In some examples, computing device 300 may provide the user with the user an opportunity to take some action in response to the error, such as determining whether the first code should be assigned to the second code, or whether instead the asset is in the wrong location. In some examples, computing device 300 may operate with one or more additional modes, such as a mode for booking out assets.

In some examples, computing device 300 does not use different modes for assignment and verification, and computing device 300 instead performs both functions in the same mode. For instance, in some examples, when computing device 300 simultaneously reads two codes and determines that there is a valid match and no rule violation, computing device 300 makes a determination as to whether either code is assigned. In these examples, if either code is already assigned, then computing device 300 makes a verification, and a determination as to whether the first code is assigned to the second code. In these examples, if the first code is not assigned to the second code, computing device 300 indicates an error or alarm. In these examples, if the first code and the second code are both unassigned, then computing device 300 makes an assignment by assigning the first code to the second code.

In various examples, the various codes may be barcodes, QR codes, passive RFID tags, or the like. Various examples above have discussed two codes: a first code and a second code, for example a first code for the asset and a second code for a location. Differentiating the first code from the second code may be done in different ways in different examples. For instance, in some examples, the first code and the second code may be different types of codes. For instance, in some examples, the first code may be a bar code, and the second code may be a QR code. In other examples, the first and second code may each be the same type of code, but may each use a different defined range of number. For instance, in some examples, the second code (e.g., the shelf location code) may be defined as beginning with a 1, and the first code (e.g., the asset code) may be defined as beginning with a 2. These examples and others are within the scope and spirit of the disclosure.

Various examples above have described scenarios in which computing device 300 may be used to assign an asset to a lot location. However, the disclosure is not so limited, and computing device 300 may be used in a variety of different applications.

For instance, examples of computing device 300 may be used in a variety of different item-location association applications, where one code corresponds to an item, and another code corresponds to a location. For instance, examples of computing device 300 may be used for parts tracking which involves the association of equipment and spare parts. As another example, examples of computing device 300 may be used for storage management and localization of semiconductor wafers in a semiconductor wafer fabrication center. Containers may initially be placed on random shelf locations by operators. The assignment of item ID and shelf location ID may subsequently occur by a fixed reader or by a wearable reader of an operator.

Examples of computing device 300 may be also used in various example of submitter-receiver association, such as parcel-customer-customer association. In some examples, a parcel may have an ID tag, and a customer have a code on some type of card such as a credit card, citizen card, driver's license, or the like, or on a wearable device or mobile device. Delivered goods confirmation may be achieved by the code association. For instance, in some examples, computing device 300 may automatically associate the parcels to the receiver of the goods. In some examples, the operator has a mobile reader, and the parcel and customer each have a unique tag.

These and other examples are within the scope of the following claims. The above specification, examples, and data provide a description of the manufacture and use of the composition of the disclosure. Since many examples of the disclosure can be made without departing from the scope and spirit of the disclosure, the disclosure also resides in the claims hereinafter appended.

What is claimed is:

1. A method for identification recognition, comprising:
   simultaneously reading, via a code input device, both a first code and a second code, wherein the code input device includes at least one of a camera or a field reader;
   determining whether the first code and the second code are in accordance with a set of rules, wherein the set of rules includes a rule that the first code and the second code must be no greater than a pre-determined distance from each other; and
   when the first code and the second code are in accordance with the set of rules, performing an assignment function that is associated with at least the first code and the second code.

2. The method of claim 1, wherein the assignment function includes assigning the first code to the second code.

3. The method of claim 1, wherein the assignment function includes determining whether the assignment function is associated with the second code.

4. The method of claim 1,
   wherein the assignment function includes:
      if the first code is unassigned
         assigning the first code to the second code,
      else
         determining whether the first code is assigned with the second code.

5. The method of claim 1, wherein the first code is affixed to an item, and wherein the first code is associated with the item.

6. The method of claim 1, wherein the second code is affixed to a shelf at a shelf location, and wherein the second code is associated with the shelf location.

7. The method of claim 1, wherein the second code is associated with at least one of a customer or a unique tag that is associated with the customer.

8. The method of claim 1, wherein the set of rules includes a rule that the second code must be beneath the first code.

9. The method of claim 1, wherein the set of rules includes a rule that the second code must be substantially aligned with the first code.

10. The method of claim 1, wherein the code input device is part of a wearable device.

11. The method of claim 1, wherein the first code is a first type of code and wherein the second code is a second type of code.

12. The method of claim 1, wherein the first code is a same type of code as the second code, the first code includes a number that is within a first pre-defined range of numbers, and wherein the second code includes a number that is within a second pre-defined range of the numbers that does not overlap with the first pre-defined range of numbers.

13. The method of claim 1, wherein the first code is at least one of a bar code, a radio frequency identification (RFID) tag, or a quick response (QR) code, and wherein the second code is at least one of a bar code, an RFID tag, or a quick response (QR) code.

14. The method of claim 1, wherein the pre-determined distance is 3 centimeters.

15. A device for identification recognition, comprising:
   at least one code input device that is configured to simultaneously read both a first code and a second code, wherein the code input device includes at least one of a camera or a field reader; and
   a processor that is configured to:
      determine whether the first code and the second code are in accordance with a set of rules, wherein the set of rules includes a rule that the first code and the second code be less than a pre-determined distance from each other; and
      when the first code and the second code are in accordance with the set of rules, perform an assignment function that is associated with at least the first code and the second code.

16. The device of claim 15, wherein the processor is further configured such that the assignment function includes assigning the first code to the second code.

17. The device of claim 15, wherein the code input device includes the field reader, and wherein the field reader includes a radio frequency identification (RFID) reader.

18. The device of claim 15, wherein the device includes wearable device that includes the code input device.

19. The device of claim 18, wherein the wearable device includes at least one of a smart watch or a head-mounted display device.

20. A tangible processor-readable storage medium storing processor-readable code for identification recognition which, when executed by one or more processors, causes the one or more processors to:
   based on input received from a code input device, simultaneously read both a first code and a second code, wherein the code input device includes at least one of a camera or a field reader;
   determine whether the first code and the second code are in accordance with a set of rules, wherein the set of rules includes a distance violation rule that requires a distance between the first code and the second code to be less than a maximum distance; and
   when the first code and the second code are in accordance with the set of rules, perform an assignment function that is associated with at least the first code and the second code.

* * * * *